(12) United States Patent
Tsirkin et al.

(10) Patent No.: US 9,256,455 B2
(45) Date of Patent: Feb. 9, 2016

(54) DELIVERY OF EVENTS FROM A VIRTUAL MACHINE TO HOST CPU USING MEMORY MONITORING INSTRUCTIONS

(71) Applicant: Red Hat Israel, Ltd., Raanana (IL)

(72) Inventors: Michael Tsirkin, Raanana (IL); Avi Kivity, Raanana (IL); Dor Laor, Raanana (IL)

(73) Assignee: Red Hat Isreal, Ltd., Raanana (IL)

( * ) Notice: Subject to any disclaimer, the term of this patent is extended or adjusted under 35 U.S.C. 154(b) by 285 days.

(21) Appl. No.: 13/681,738

(22) Filed: Nov. 20, 2012

(65) Prior Publication Data

US 2014/0143771 A1 May 22, 2014

(51) Int. Cl.
*G06F 9/455* (2006.01)

(52) U.S. Cl.
CPC .. *G06F 9/45558* (2013.01); *G06F 2009/45587* (2013.01)

(58) Field of Classification Search
CPC .................. G06F 9/45558; G06F 2009/45587
USPC ................................................... 718/1; 711/6
See application file for complete search history.

(56) References Cited

U.S. PATENT DOCUMENTS

| | | | |
|---|---|---|---|
| 8,239,610 B2* | 8/2012 | van Riel et al. | 711/6 |
| 8,473,946 B2* | 6/2013 | Malyugin et al. | 718/1 |
| 8,510,756 B1* | 8/2013 | Koryakin et al. | 719/318 |
| 2003/0126186 A1* | 7/2003 | Rodgers | G06F 9/3009 718/107 |
| 2004/0030873 A1* | 2/2004 | Park et al. | 712/245 |
| 2006/0200616 A1* | 9/2006 | Maliszewski | G06F 9/45533 711/6 |
| 2009/0172284 A1* | 7/2009 | Offen | G06F 12/084 711/125 |
| 2010/0115513 A1* | 5/2010 | Moriki et al. | 718/1 |
| 2010/0199277 A1* | 8/2010 | Galal et al. | 718/1 |
| 2011/0161541 A1* | 6/2011 | Madukkarumukumana | G06F 9/4812 710/260 |
| 2012/0131575 A1* | 5/2012 | Yehuda et al. | 718/1 |
| 2014/0149979 A1* | 5/2014 | Tsirkin et al. | 718/1 |

* cited by examiner

*Primary Examiner* — Emerson Puente
*Assistant Examiner* — Willy W Huaracha
(74) *Attorney, Agent, or Firm* — Lowenstein Sandler LLP

(57) ABSTRACT

A method and system for managing a virtual computing system including a virtual machine (VM) configured to send an event to a host CPU executing a memory monitoring instruction. The virtual machine is configured to receive from a hypervisor a notification identifying an address range writeable by a virtual central processing unit (VCPU) associated with the virtual machine to send an event to a host central processing unit (CPU). The virtual machine is further configured to receive an instruction to write to the identified address range for sending an event to the host CPU. The VCPU of the virtual machine may then write data identifying an event for execution by the host CPU to the identified address range, without causing an exit to the hypervisor.

18 Claims, 4 Drawing Sheets

DELIVERY OF EVENTS FROM A VIRTUAL MACHINE TO HOST CPU USING MEMORY MONITORING INSTRUCTIONS

TECHNICAL FIELD

Embodiments of the present disclosure relate to a computer system, and more specifically, to managing the delivery of an event from a virtual machine to a host central processing unit (CPU) based on memory monitoring instructions in a virtualized computing system.

BACKGROUND

In order to preserve power resources and lower overhead usage, conventional physical CPUs utilize memory monitoring instructions (e.g., monitor and mwait instructions) designating a range of memory that allow the physical CPU to stop instruction execution. The physical CPU executing the monitoring instruction is blocked from further execution and enters a wait state until there is a change to the designated memory by another physical CPU or an inter-processor interrupt is received.

However, in virtualized computing systems, if a virtual machine attempts to write to the designated memory block in order to wake-up the physical CPU executing memory monitoring instructions, a virtual machine exit is performed which causes a transition of control from the virtual machine to the software layer providing the virtualization, commonly referred to as a hypervisor (also known as a virtual machine monitor (VMM)).

DETAILED DESCRIPTION

Methods and systems for managing a virtual computing system including a virtual machine (VM) configured to send an event to a host CPU executing a memory monitoring instruction. The host CPU executes the memory monitoring instruction (e.g., a wait instruction) on a designated memory range. The virtual computing system includes a hypervisor configured to notify a virtual CPU (VCPU) of the VM (also referred to as the "source VM") that the source VM may write to the designated memory address (e.g., modify the designated memory) in order to send a request for the performance of an event or action (e.g., the sending of a network packet) to the host CPU. The VCPU of the source VM may send an event to the host CPU by writing data to the designated memory range, without causing a VM exit. In an example, after receiving the event, the host CPU may retrieve event information from the source VM.

In an example, the guest includes an event source manager configured to receive notifications from the hypervisor regarding the designated memory ranges that are writeable by the VCPU of the source VM to deliver an event. In an example, the event source manager is further configured to track the host CPU and the designated memory range in order to write to the appropriate memory range to notify the host CPU of the desired event for which the source VM seeks performance.

Accordingly, an efficient method and system is provided that enables a virtual machine (e.g., the source VM) to send events to the host CPU using memory monitoring instructions, without causing an exit to the hypervisor. The avoidance of an exit to the hypervisor allows for the delivery of event requests to the host CPU without the trapping of instructions by the hypervisor and the computational and time expense associated with a conventional interrupt (e.g., the computational/time expense associated with jumping to an interrupt vector).

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
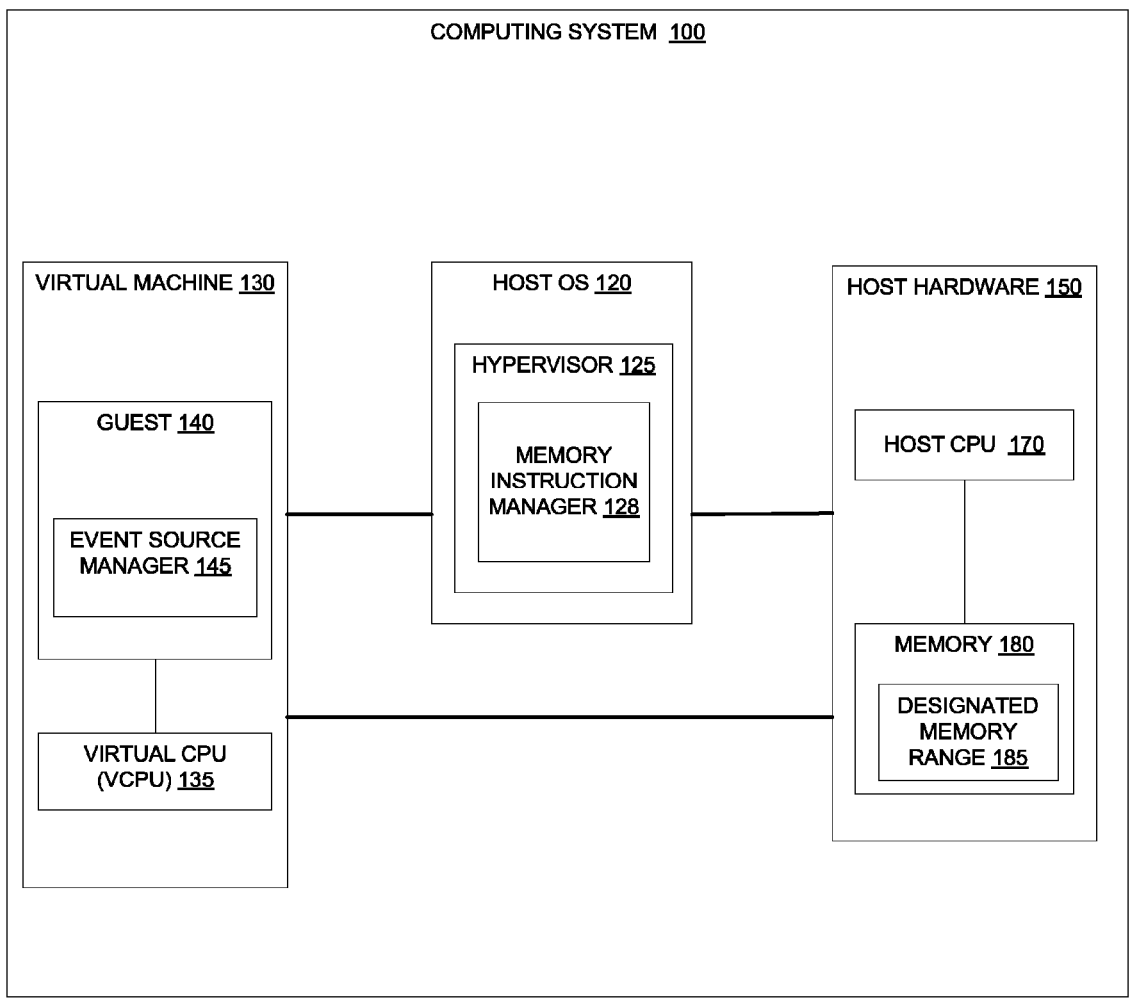
FIG. 1 is a block diagram of an example computer system configured to allow a virtual machine to deliver an event to a host CPU without a virtual machine exit, according to an embodiment of the present disclosure.

FIG. 1 is a block diagram that illustrates an example computing system 100 in which examples of the present disclosure may operate. The computing system 100 hosts a virtual machine (VM) 130, also referred to as the "source VM". The virtual machine 130 runs a guest (e.g., guest 140) that uses a guest operating system to manage its resources. The virtual machine 130 may run the same or different guest operating systems, such as Microsoft Windows®, Linux®, Solaris®, Mac® OS, etc. The computing system 100 may be a server, a workstation, a personal computer (PC), a mobile phone, a palm-sized computing device, a personal digital assistant (PDA), etc.

Throughout the following description, the term "guest" refers to the computer readable instructions run on the hypervisor that is installed on a disk, loaded into memory, or currently running. A guest may include one or more of the following: a firmware copy in memory, an operating system, additional installed software, a browser, applications running on the browser, etc. The term "virtual machine" (VM) refers to part of a host system that is visible to the guest. A virtual machine may include one or more of the following: memory, virtual CPU (e.g., VCPU 135), virtual devices (e.g., emulated NIC or disk), physical devices over which a guest is given partial or full control, firmware such as Basic Input/Output System (BIOS), Extensible Firmware Interface (EFI) and Advanced Configuration and Power Interface (ACPI) which is provided to the guest, etc.

In one example, the computing system 100 runs a hypervisor 125 to virtualize access to the underlying host hardware 150, making the use of the virtual machine 130 transparent to the guest 140 and the users of the computing system 100. In one example, the hypervisor 125 may support the virtual machine 130. In one example, the hypervisor 125 is part of a host operating system (OS) 120.

In one example, the computing system 100 also includes hardware components (host hardware) including a host central processing unit (CPU) 170. The computing system 100 may also include memory 180, input/output (I/O) devices and other hardware components (not shown). In one example, the host CPU 170 is configured to handle event requests from the virtual machines 130 in accordance with the method described in connection with FIG. 2. Example event requests submitted by a guest 140 include a request to transmit a packet, a request to perform a disk I/O operation, a request to output an image to a display, a request to send data on a serial port, etc.

In an example, the hypervisor 125 includes a memory instruction manager 128 configured to notify the VCPU 135 of the VM 130 of an address range 185 of memory 180 that may be written to in order to deliver an event to the host CPU 170 (also referred to as a "memory designation notification"). It is noted that the memory designation notification may be provided by the hypervisor 125 either prior to or following the execution of a memory instruction (e.g., a wait instruction) by the host CPU 170 on the designated memory range 185. In an example, the memory instruction manager 128 is also configured to notify the source VM 130 that the source VM 130 may write to the designated memory range 185 (e.g., modify the designated memory range) in order to wake up the host CPU and deliver an event to the host CPU (also referred to as an "memory writing notification"). In an example, the notification provided to the source VM 130 instructs the source VM 130 that a write to the designated memory range 185 may be used to wake up the host CPU, without causing an exit to the hypervisor 125. In an example, after receiving the event, the host CPU 170 may retrieve event information from the source VM.

In an example, the guest 140 includes an event source manager 145 configured to receive the memory designation notification and the memory writing notification from the hypervisor 125. In an example, the event source manager 145 is further configured to use the notifications to maintain or store an association between the host CPU and the designated memory range in order to identify the appropriate memory range to write to in order to notify the host CPU 170 of a requested event.

In an example, the memory instruction manager 128 is configured to manage the memory range designations and assignments. In this example, the memory instruction manager 128 may reserve different memory ranges for specific event sources. For example, a first designated memory range may be dedicated for use by source VCPUs, a second designated memory range may be dedicated for use by physical CPUs, a third designated memory range may be dedicated for use by one or more devices (e.g., a printer, a display), etc.).

In an example, the memory 180 and/or the designated memory range 185 may include a portion which is protected and not writeable by the VCPU 135 of the source VM 130. In an example, the protected portion may be writeable by another host CPU (e.g., a second host CPU) in order for the second host CPU to wake up the host CPU 170 to receive and perform a requested event.

Advantageously, the delivery of events from the source VM 130 to the host CPU 150 using memory monitoring instructions, without causing an exit to the hypervisor, results in the avoidance of the trapping of instructions by the hypervisor 125 and the reduction in the computational and time expenses associated with the jumping to an interrupt vector associated with a conventional interrupt of a physical CPU.

Figure 2:
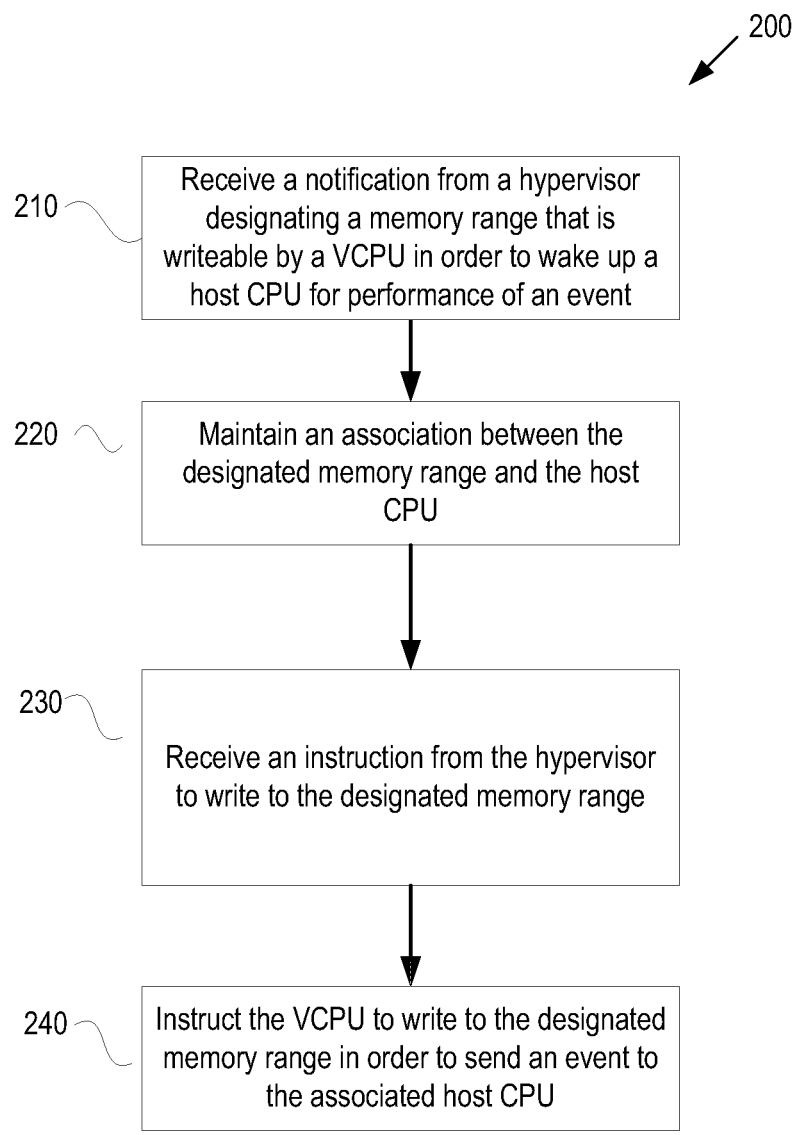
FIG. 2 is a flow diagram of an example method executed by a virtual machine for managing the delivery of an event from the virtual machine to a host CPU without a virtual machine exit, according to an embodiment of the present disclosure.

FIG. 2 is a flow diagram illustrating one example of a method 200 for the delivery of an event, by a VCPU of a source VM, for execution by a host CPU using a memory monitoring instruction, without causing an exit to a hypervisor managing the source VM. The method 200 may be performed by a computing system 100 of FIG. 1 that may comprise hardware (e.g., circuitry, dedicated logic, programmable logic, microcode, etc.), software (e.g., instructions run on a processing device), or a combination thereof. In one example, the method 200 is performed by the event source manager 145 of the source VM 130 of FIG. 1.

In one example, prior to the execution of method 200, a host CPU (e.g., the host CPU 170 of FIG. 1) executes a memory monitoring instruction (e.g., a wait instruction) on a memory range (e.g., the designated memory range 185 of FIG. 1). In addition, prior to the execution of method 200, a hypervisor (e.g., hypervisor 125 of FIG. 1) provides a notification to a VCPU of a source VM (e.g., VCPU 135 of VM 130 in FIG. 1) identifying an address range that may be written to by the VCPU in order to deliver an event to a host CPU. It is noted that the aforementioned setup steps may be performed in any order, e.g., the memory monitoring instruction may be executed before the hypervisor provides the notification to the VCPU, or vice versa.

As shown in FIG. 2, method 200 begins when the source virtual machine receives a notification from the hypervisor designating an address range that is writeable by a VCPU of the source virtual machine in order to wake up the host CPU for performance of an event, in block 210. In an example, the designated memory range may include a portion that is protected and not writeable by the source VM. Optionally, the protected portion of the designated memory range may be reserved for use by another host CPU. In an example, the source VM may instruct the VCPU to write to a portion of the designated memory range which is dedicated for use by a VCPU.

Referring to FIG. 2, in block 220, the source VM is configured to maintain an association between the designated memory range and host CPU to enable the source VM to manage event delivery and track the manner in which the memory location associated with a host CPU may be modified in the virtual mode in order to deliver an event for execution. In an example, the source VM may store the association between the designated memory range and the host CPU in a memory associated with the source VM.

In block 230, the source VM receives a notification or instruction from the hypervisor to write to the designated memory range in order to deliver an event to the associated host CPU. In block 240, the source VM instructs a VCPU to write to the designated memory range (e.g., modifies the memory) to wake up the associated host CPU and deliver an event to the host CPU, without an exit to the hypervisor. In an example, the data written to the designated memory range includes information defining the specific event that is to be executed. In this example, the host CPU reads the data that is written to the designated memory block to identify what action the host CPU is being asked to perform. In an example, in block 230, the modifications to the designated memory range may be performed by one or more atomic instructions (e.g., a locked memory instruction).

Advantageously, the method 200 realizes the benefit of allowing a virtual machine to deliver event requests to a host CPU using memory monitoring instructions without causing a VM exit to the hypervisor, thereby reducing the computational and time overhead associated with the VM exit communication protocol and without a conventional interrupt and the associated computational/time expense associated with jumping to an interrupt vector.

Figure 3:
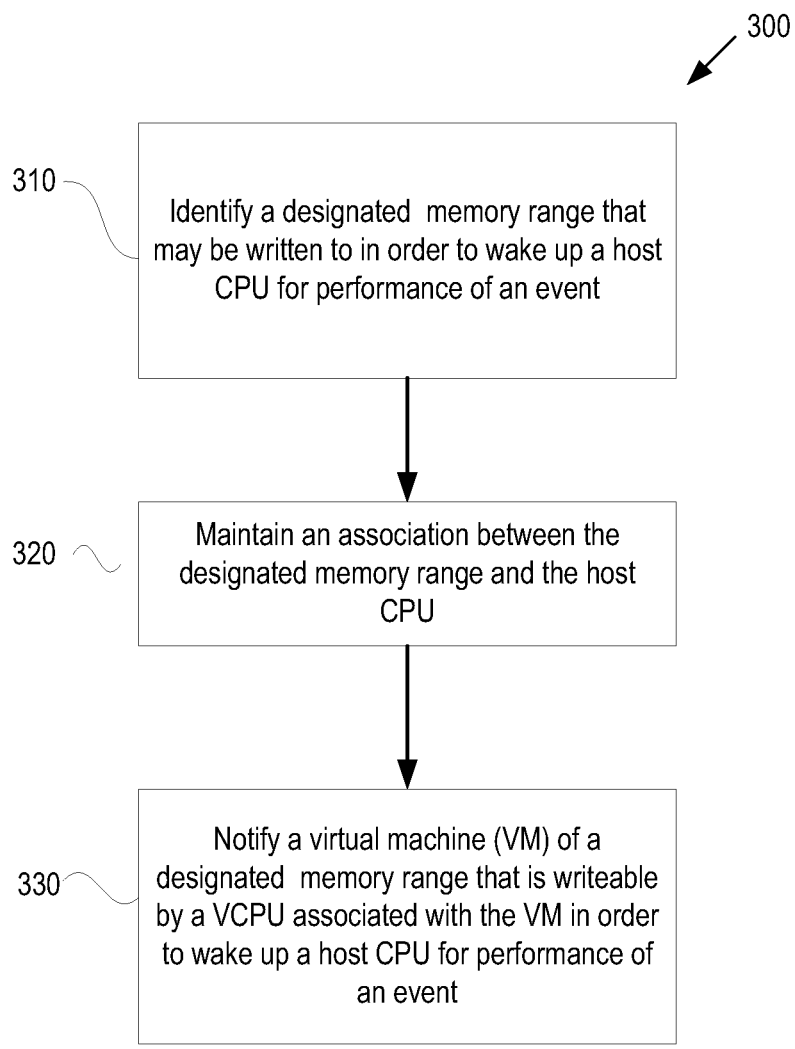
FIG. 3 is a flow diagram of an example method executed by a hypervisor for managing the delivery of an event from a virtual machine to a host CPU without a virtual machine exit, according to an embodiment of the present disclosure.

FIG. 3 is a flow diagram illustrating one example of a method 300 for facilitating the delivery of an event by a source VM to a host CPU using a memory monitoring instruction, without causing an exit to a hypervisor managing the source VM. The method 300 may be performed by a computing system 100 of FIG. 1 that may comprise hardware (e.g., circuitry, dedicated logic, programmable logic, microcode, etc.), software (e.g., instructions run on a processing device), or a combination thereof. In one example, the method 300 is performed by the memory instruction manager 128 of the hypervisor 125 of FIG. 1.

In one example, prior to the execution of method 300, a host CPU (e.g., the host CPU 170 of FIG. 1) executes a memory monitoring instruction (e.g., a wait instruction) on a memory range (e.g., the designated memory range 185 of FIG. 1). In block 310, the hypervisor (e.g., hypervisor 125 of FIG. 1) identifies an address range that may be written to in order to deliver an event to a host CPU. In an example, the hypervisor may perform the designation of the address range prior to the execution of the memory monitoring instruction by the host CPU. In block 320, the hypervisor maintains, tracks and or records the association between the designated memory range and the host CPU in a memory associated with the hypervisor. In an example, in managing the designated memory range, the hypervisor may instruct the virtual machine to employ different memory ranges for use by different event source types (e.g., a first memory range may be designated for use by one or more VCPUs, a second memory range may be designated for use by one or more physical CPUs, a third memory range may be designated for use by one or more devices, etc.).

As shown in FIG. 3, in block 330, the hypervisor notifies a virtual machine (e.g., virtual machine 130 of FIG. 1) of the designated address range that is writeable by a VCPU of the virtual machine in order to wake up the host CPU for performance of an event, without causing an exit to the hypervisor. In an example, the designated memory range may include a portion that is protected and not writeable by the source VM. Optionally, the protected portion of the designated memory range may be reserved for use by another host CPU. In an example, in managing the designated memory range, the hypervisor may instruct the virtual machine to employ different memory ranges for use by different event source types (e.g., a first memory range may be designated for use by one or more VCPUs, a second memory range may be designated for use by one or more physical CPUs, a third memory range may be designated for use by one or more devices, etc.).

According to the example method 300, the hypervisor may coordinate the delivery of an event request by a virtual machine to a host CPU using memory monitoring instructions, without causing a VM exit to the hypervisor, thereby reducing the computational and time overhead associated with the VM exit communication protocol and without a conventional interrupt and the associated computational/time expense associated with jumping to an interrupt vector.

Figure 4:
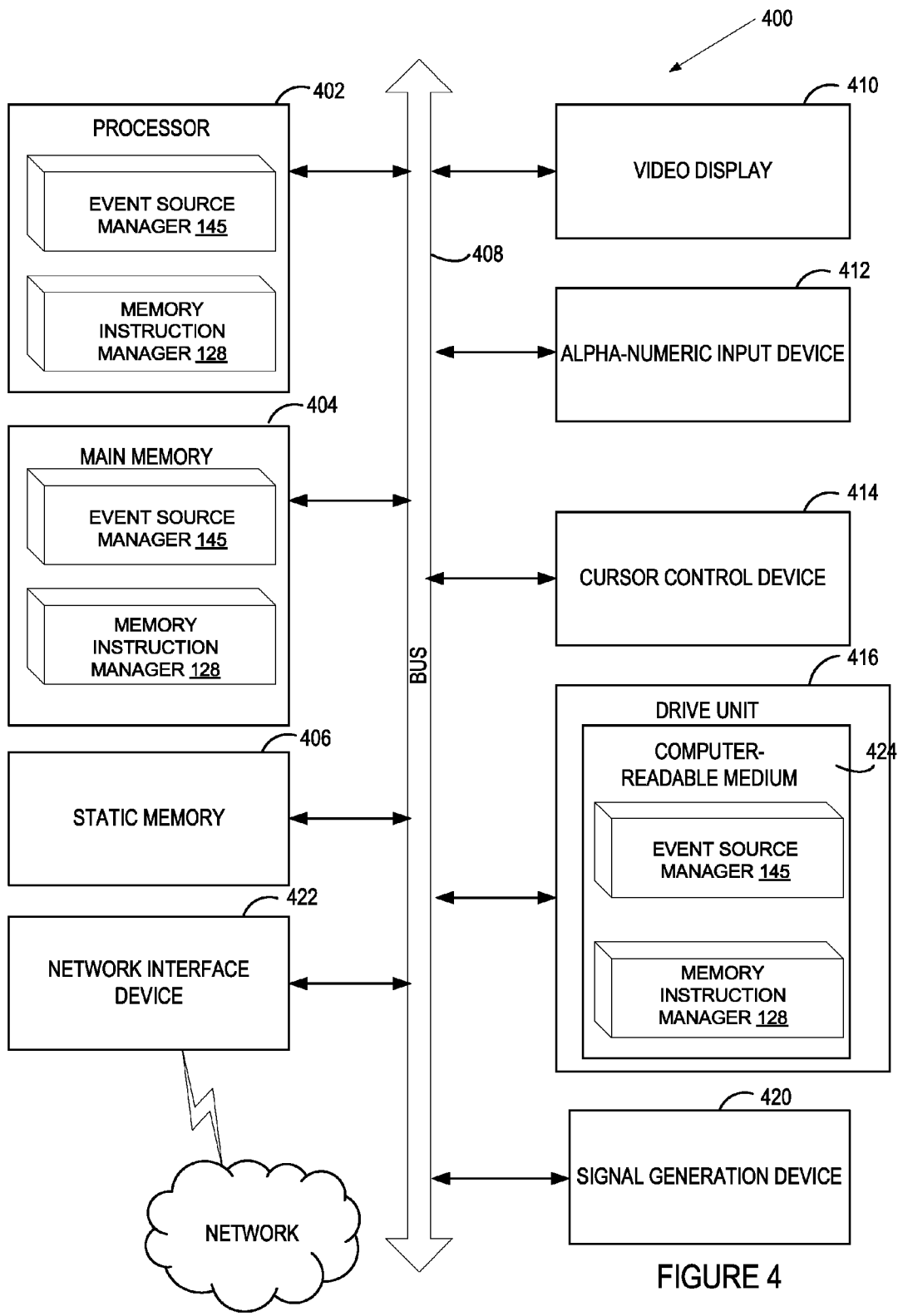
FIG. 4 illustrates a diagrammatic representation of an example event delivery management system, according to an embodiment of the present disclosure.

FIG. 4 illustrates a diagrammatic representation of a machine in the example form of a computer system 400 within which a set of instructions, for causing the machine to perform any one or more of the methodologies discussed herein, may be executed. In some examples, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The event source manager 145 and/or the memory instruction manager 128 shown in FIG. 1 may be executed by processor 402 configured to perform the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

A drive unit 416 may include a computer-readable medium 424 on which is stored one or more sets of instructions (e.g., instructions of the event source manager 145 and/or the memory instruction manager 128) embodying any one or more of the methodologies or functions described herein. The instructions of the event source manager 145 and/or the memory instruction manager 128 may also reside, completely or at least partially, within the main memory 404 and/or within the processor 402 during execution thereof by the computer system 400, the main memory 404 and the processor 402 also constituting computer-readable media. The instructions of the event source manager 145 and/or the memory instruction manager 128 may further be transmitted or received over a network via the network interface device 422.

While the computer-readable storage medium 424 is shown in an example to be a single medium, the term "computer-readable storage medium" should be taken to include a single non-transitory medium or multiple non-transitory media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the above description, numerous details are set forth. It is apparent, however, to one of ordinary skill in the art having the benefit of this disclosure, that examples of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "instructing", "maintaining", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Examples of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. Example structure for a variety of these systems appears from the description herein. In addition, the present disclosure is not described with reference to any particular programming language. It will be appreciated that a variety of programming languages may be used to implement the teachings of the disclosure as described herein.

It is to be understood that the above description is intended to be illustrative, and not restrictive. Many other examples will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    executing, by a host central processing unit (CPU), a memory monitoring instruction to identify an address range;
    receiving, by a virtual machine executing a guest, from a hypervisor executable by the host CPU, a notification identifying the identified address range writeable by a virtual central processing unit (VCPU) associated with the virtual machine to send an event to the host CPU;
    receiving, by the virtual machine, an instruction to write to the identified address range for sending an event to the host CPU; and
    writing, by the VCPU, data identifying an event for execution by the host CPU to the identified address range, without causing an exit to the hypervisor.

2. The method of claim 1, wherein the identified address range comprises a protected portion not writeable by the VCPU.

3. The method of claim 1, wherein the identified address range is dedicated for writing to by the VCPU.

4. The method of claim 1, wherein writing to the identified address range comprises executing an atomic instruction.

5. The method of claim 1, further comprising maintaining, by the virtual machine, an association between the identified address range and the host CPU.

6. The method of claim 1, wherein the hypervisor maintains an assignment of a plurality of additional address ranges associated with the host CPU, wherein each of the plurality of additional address ranges is dedicated for writing to by a specific source type.

7. A non-transitory computer readable storage medium comprising instructions that, when executed by a host central processing unit (CPU), cause the host CPU to:
    execute a memory monitoring instruction to identify an address range;
    receive, by a virtual machine executing a guest from a hypervisor executable by the host CPU, a notification identifying the identified address range writeable by a virtual central processing unit (VCPU) associated with the virtual machine to send an event to the host CPU;
    receive, by the virtual machine, an instruction to write to the identified address range for sending an event to the host CPU; and
    write, by the VCPU, data identifying an event for execution by the host CPU to the identified address range, without causing an exit to the hypervisor.

8. The non-transitory computer readable storage medium of claim 7, wherein the identified address range comprises a protected portion not writeable by the VCPU.

9. The non-transitory computer readable storage medium of claim 7, wherein the identified address range is dedicated for writing to by the VCPU.

10. The non-transitory computer readable storage medium of claim 7, wherein the data identifying the event for execution by the host CPU is written to the identified address range by an atomic instruction.

11. The non-transitory computer readable storage medium of claim 7, the host CPU to maintain an association between the identified address range and the host CPU.

12. The non-transitory computer readable storage medium of claim 7, wherein the hypervisor maintains an assignment of a plurality of additional address ranges associated with the host CPU, wherein each of the plurality of additional address ranges is dedicated for writing to by a specific source type.

13. A computer system comprising:
    a memory; and
    a host central processing unit (CPU) operatively coupled to the memory, the host CPU to:
    execute a memory monitoring instruction to identify an address range;

receive, by a virtual machine, from a hypervisor executable by the host CPU, a notification identifying the identified address range writeable by a virtual central processing unit (VCPU) associated with the virtual machine to send an event to the host CPU;

receive an instruction to write to the identified address range for sending an event to the host CPU; and write, by the VCPU of the virtual machine, data identifying an event for execution by the host CPU to the identified address range, without causing an exit to the hypervisor.

14. The computer system of claim 13 wherein the identified address range comprises a protected portion not writeable by the VCPU.

15. The computer system of claim 13, wherein the identified address range is dedicated for writing to by the VCPU.

16. The computer system of claim 13, the processing device to write to the identified address range by executing an atomic instruction.

17. The computer system of claim 13, wherein the virtual machine maintains an association between the identified address range and the host CPU.

18. The computer system of claim 13, wherein the hypervisor maintains an assignment of a plurality of additional address ranges associated with the host CPU, wherein each of the plurality of additional address ranges is dedicated for writing to by a specific source type.

* * * * *